(12) United States Patent
Youn et al.

(10) Patent No.: US 10,028,209 B2
(45) Date of Patent: Jul. 17, 2018

(54) METHOD FOR SELECTING AN ENHANCED PACKET DATA GATEWAY (EPDG) BY A USER EQUIPMENT

(71) Applicant: LG Electronics Inc., Seoul (KR)

(72) Inventors: Myungjune Youn, Seoul (KR); Jinsook Ryu, Seoul (KR); Hyunsook Kim, Seoul (KR); Laeyoung Kim, Seoul (KR); Dongsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/381,503

(22) Filed: Dec. 16, 2016

(65) Prior Publication Data

US 2017/0188398 A1 Jun. 29, 2017

Related U.S. Application Data

(60) Provisional application No. 62/387,429, filed on Dec. 24, 2015.

(51) Int. Cl.

| *H04W 76/16* | (2018.01) |
| *H04W 48/16* | (2009.01) |
| *H04W 8/12* | (2009.01) |
| H04W 84/04 | (2009.01) |
| H04W 48/18 | (2009.01) |

(52) U.S. Cl.
CPC .......... *H04W 48/16* (2013.01); *H04W 8/12* (2013.01); *H04W 48/18* (2013.01); *H04W 84/042* (2013.01)

(58) Field of Classification Search
CPC ..... H04W 8/12; H04W 48/16; H04W 84/042; H04W 48/18; H04W 76/02; H04W 64/00; H04W 28/0226; H04W 36/00; H04W 92/02; H04W 92/08; H04W 88/16; H04W 48/00; H04W 48/20; H04W 88/00; H04W 88/02; H04W 88/18; H04W 92/06; H04W 76/12; H04W 76/16; H04W 8/02; H04W 8/04; H04W 8/06; H04W 8/08; H04W 60/00; H04W 36/34; H04W 92/00; H04W 76/10; G06F 9/4451; H04M 15/8038
See application file for complete search history.

(56) References Cited

U.S. PATENT DOCUMENTS

| 9,681,419 | B2 * | 6/2017 | Anchan | ............... H04W 72/005 |
| 2011/0261787 | A1 * | 10/2011 | Bachmann | ............ H04L 63/029 370/331 |
| 2012/0264412 | A1 * | 10/2012 | Tervonen | .............. H04W 48/08 455/418 |

(Continued)

*Primary Examiner* — Meless Zewdu
(74) *Attorney, Agent, or Firm* — Dentons US LLP

(57) ABSTRACT

One disclosure of the present invention provides a method for selecting an enhanced packet data gateway (ePDG). The method may be performed by a user equipment (UE) and comprise: determining, by the UE which has roamed from a home public land mobile network (H-PLMN) to a visited public land mobile network (V-PLMN), whether there exists an indication for selecting ePDG in the V-PLMN; determining, by the UE, whether the UE has attached to any PLMN in the V-PLMN, when it is determined that there exists the indication; determining, by the UE, whether there exists an ePDG PLMN list for the any PLMN in the V-PLMN, when it is determined that the UE has attached to the any PLMN; and selecting, by the UE, at least one ePDG in the ePDG PLMN list.

10 Claims, 13 Drawing Sheets

(56) References Cited

U.S. PATENT DOCUMENTS

| | | | | |
|---|---|---|---|---|
| 2012/0322412 | A1* | 12/2012 | Qiang | H04W 48/16 |
| | | | | 455/411 |
| 2015/0350983 | A1* | 12/2015 | Kwok | H04L 65/1069 |
| | | | | 370/331 |
| 2016/0037328 | A1* | 2/2016 | Raveendran | H04W 8/08 |
| | | | | 370/328 |
| 2016/0295386 | A1* | 10/2016 | Faccin | H04L 63/0485 |
| 2016/0337310 | A1* | 11/2016 | Faccin | H04W 4/90 |
| 2016/0337942 | A1* | 11/2016 | Catovic | H04W 48/08 |
| 2017/0005914 | A1* | 1/2017 | Edge | H04L 45/26 |
| 2017/0005941 | A1* | 1/2017 | Stapleton | H04W 72/0446 |
| 2017/0105155 | A1* | 4/2017 | Zhao | H04W 36/12 |
| 2017/0135031 | A1* | 5/2017 | Buckley | H04B 1/3816 |

* cited by examiner

METHOD FOR SELECTING AN ENHANCED PACKET DATA GATEWAY (EPDG) BY A USER EQUIPMENT

CROSS-REFERENCE TO RELATED APPLICATIONS

This application claims the benefit of U.S. Provisional Application No. 62/387,429 filed on Dec. 24, 2015, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
|---|---|
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |

TABLE 1-continued

| REFERENCE POINT | DESCRIPTION |
|---|---|
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5*b* illustrates a connection process in a radio resource control (RRC) layer.

FIG. 5*b* shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, it becomes legal to monitor communications between terrorists in order to deter Islamic State (IS) terror threats in recent times. Accordingly, countries request Lawful Interception (LI) from telecommunications providers. Therefore, upon a request for LI from a state agency, a telecommunications provider may monitor communications of a specific user. Here, monitoring needs to be fully performed not only on communications of a subscriber to the telecommunications provider but also on communications of a roaming user from another telecommunications provider.

However, when a user roams a visitor-based network and performs communications via a wireless local area network (that is, Wi-Fi), it is impossible to monitor the user.

Therefore, it is necessary to present a technique for legally monitoring communications between terrorists.

SUMMARY OF THE INVENTION

Accordingly, one disclosure of this specification is to propose a scheme capable of solving the aforementioned problems.

In order to achieve the aforementioned purpose, one disclosure of the present invention provides a method for selecting an enhanced packet data gateway (ePDG). The method may be performed by a user equipment (UE) and comprise: determining, by the UE which has roamed from a home public land mobile network (H-PLMN) to a visited public land mobile network (V-PLMN), whether there exists an indication for selecting ePDG in the V-PLMN; determining, by the UE, whether the UE has attached to any PLMN in the V-PLMN, when it is determined that there exists the indication; determining, by the UE, whether there exists an ePDG PLMN list for the any PLMN in the V-PLMN, when it is determined that the UE has attached to the any PLMN; and selecting, by the UE, at least one ePDG in the ePDG PLMN list.

The method may further comprise: receiving the indication for selecting ePDG in the V-PLMN. Here, the indication may be received by using at least one of system information block (SIB), an Attach Accept message, a tracking area update (TAU) accept message and a policy of access network discovery and selection Function (ANDSF).

The method may further comprise: receiving the ePDG PLMN list. Here, the ePDG PLMN list may be received by using at least one of system information block (SIB), an Attach Accept message, a tracking area update (TAU) accept message and a policy of access network discovery and selection Function (ANDSF).

The method may further comprise: determining a country in which the UE locates, when is determined that the UE has not attached to the any PLMN in the V-PLMN; determining whether there exists an ePDG PLMN list for the determined country; selecting at least one ePDG in the ePDG PLMN list when there exists the ePDG PLMN list for the determined country; and selecting at least one ePDG in the determined country when there does not exist the ePDG list for the determined country.

The method may further comprise: selecting at least one ePDG in the any PLMN, when it is determined that there does not exist the ePDG PLMN list.

In order to achieve the aforementioned purpose, one disclosure of the present invention provides also a user equipment (UE) for selecting an enhanced packet data gateway (ePDG). The UE may comprise: a transceiver; and a processor configured to control the transceiver and to perform the following: determining, in a roamed state from a home public land mobile network (H-PLMN) to a visited public land mobile network (V-PLMN), whether there exists an indication for selecting ePDG in the V-PLMN; determining whether the UE has attached to any PLMN in the V-PLMN, when it is determined that there exists the indication; determining whether there exists an ePDG PLMN list for the any PLMN in the V-PLMN, when it is determined that the UE has attached to the any PLMN; and selecting at least one ePDG in the ePDG PLMN list.

According to the embodiments of the present invention, the problems in the related art can be solved.

DESCRIPTION OF EXEMPLARY EMBODIMENTS

Figure 1:
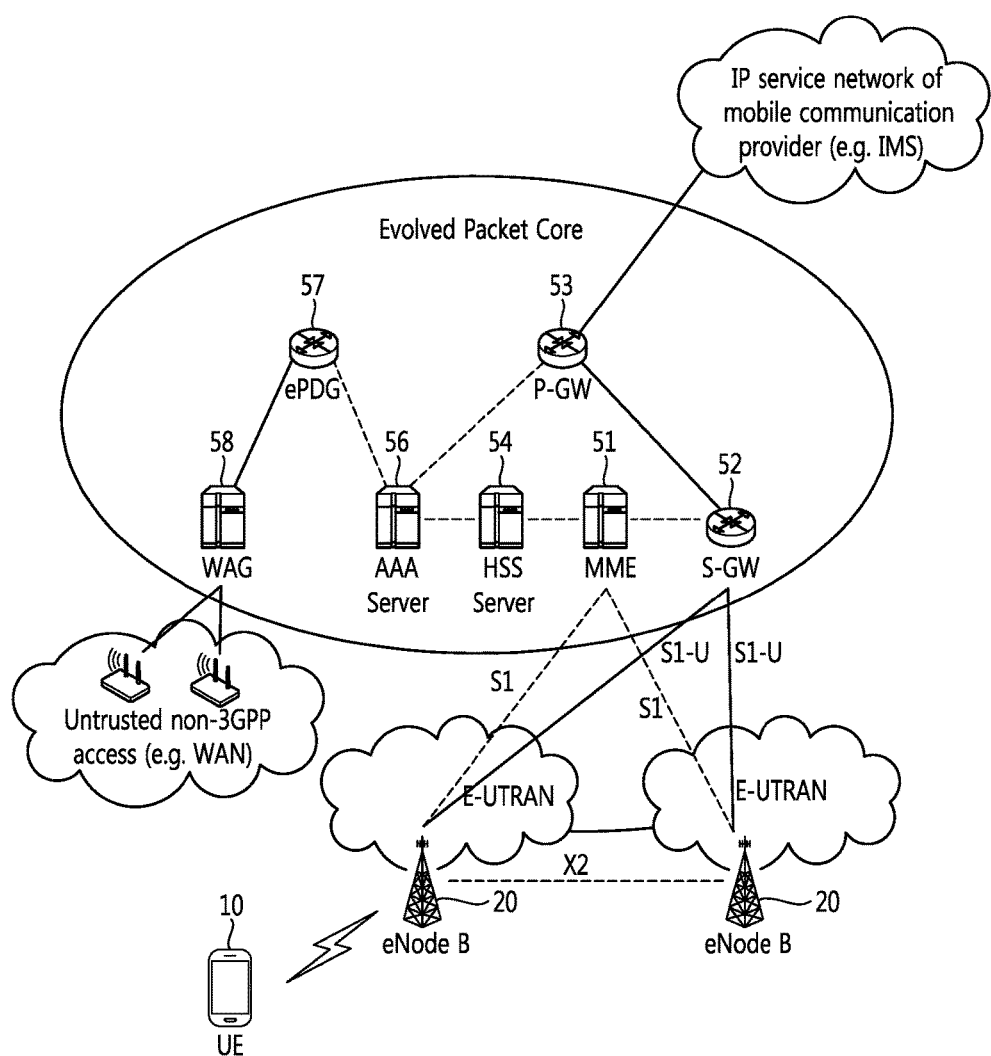
FIG. 1 is a structural diagram of an evolved mobile communication network.
Figure 2:
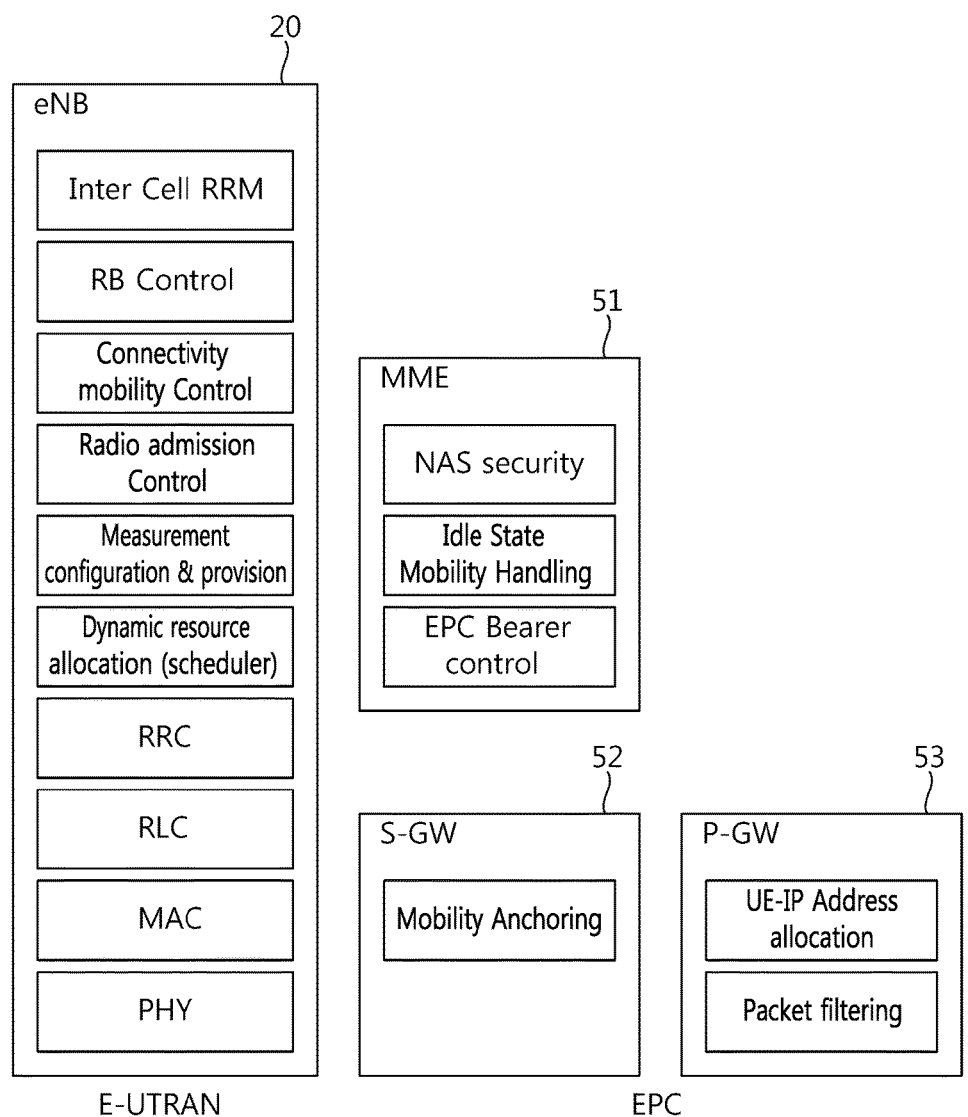
FIG. 2 is an exemplary diagram illustrating architectures of a general E-UTRAN and a general EPC.
Figure 3:
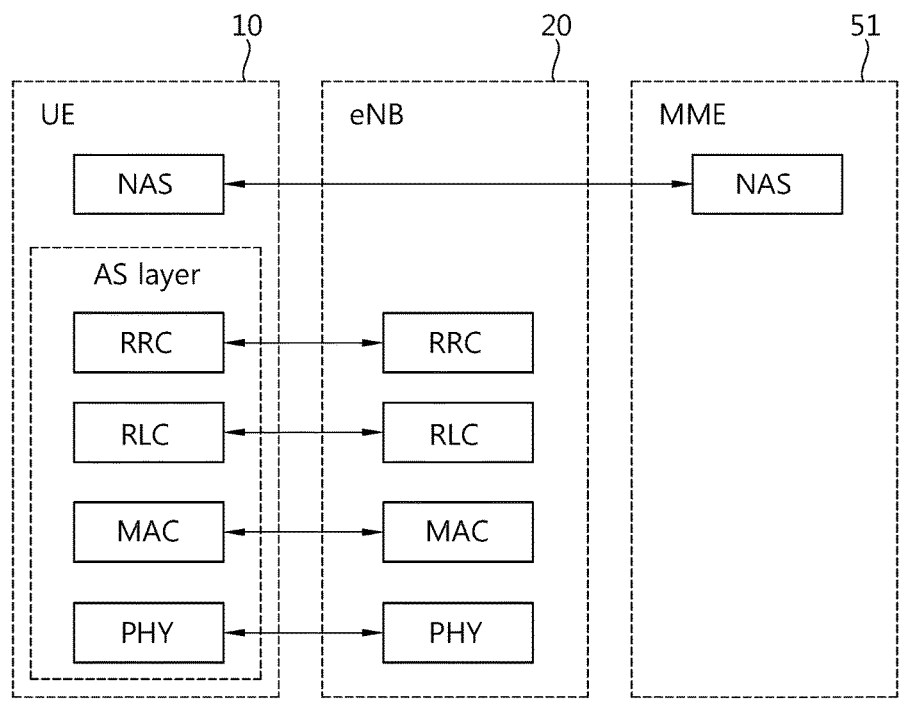
FIG. 3 is an exemplary diagram illustrating a structure of a radio interface protocol on a control plane between UE and eNodeB.
Figure 4:
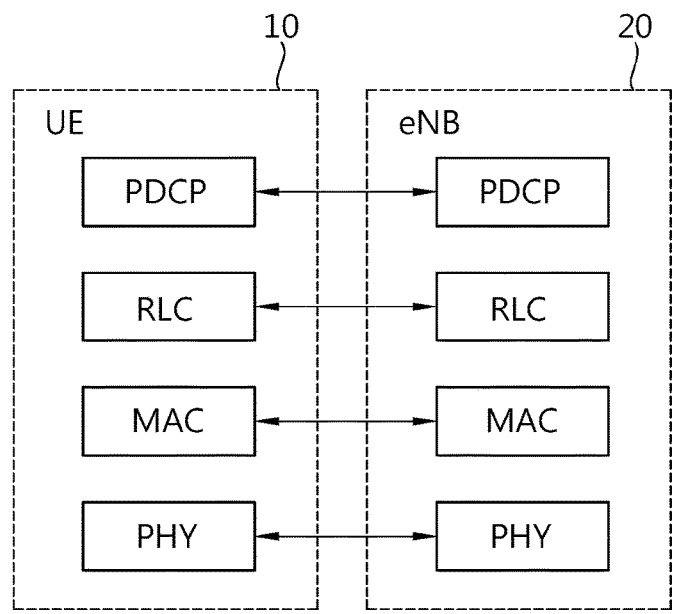
FIG. 4 is another exemplary diagram illustrating a structure of a radio interface protocol on a user plane between the UE and a base station.
Figure 5A:
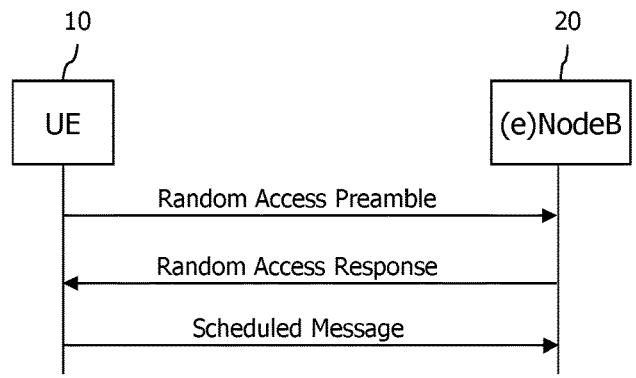
FIG. 5a is a flowchart illustrating a random access process in 3GPP LTE.
Figure 5B:
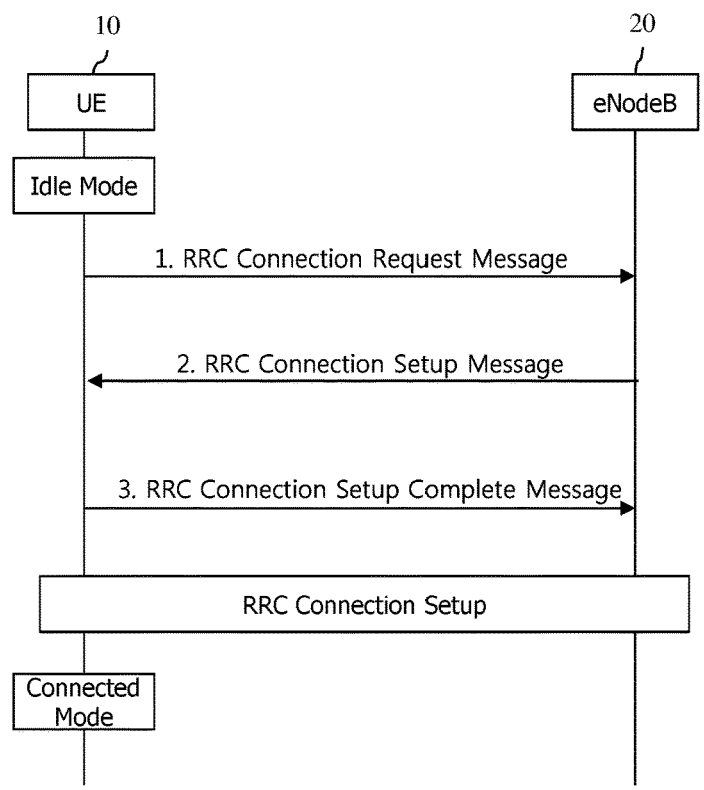
FIG. 5b illustrates a connection process in a radio resource control (RRC) layer.

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition of Terms

For better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

RAT: an abbreviation of Radio Access Technology. Means GERAN, UTRAN, E-UTRAN, etc.

IPsec (Internet Protocol Security): IPsec is a protocol suite for securing Internet Protocol (IP) communications by authenticating and encrypting each IP packet of a communication session Each of embodiments proposed herein may be implemented solely, but the embodiments may be implemented in combination.

Figure 6:
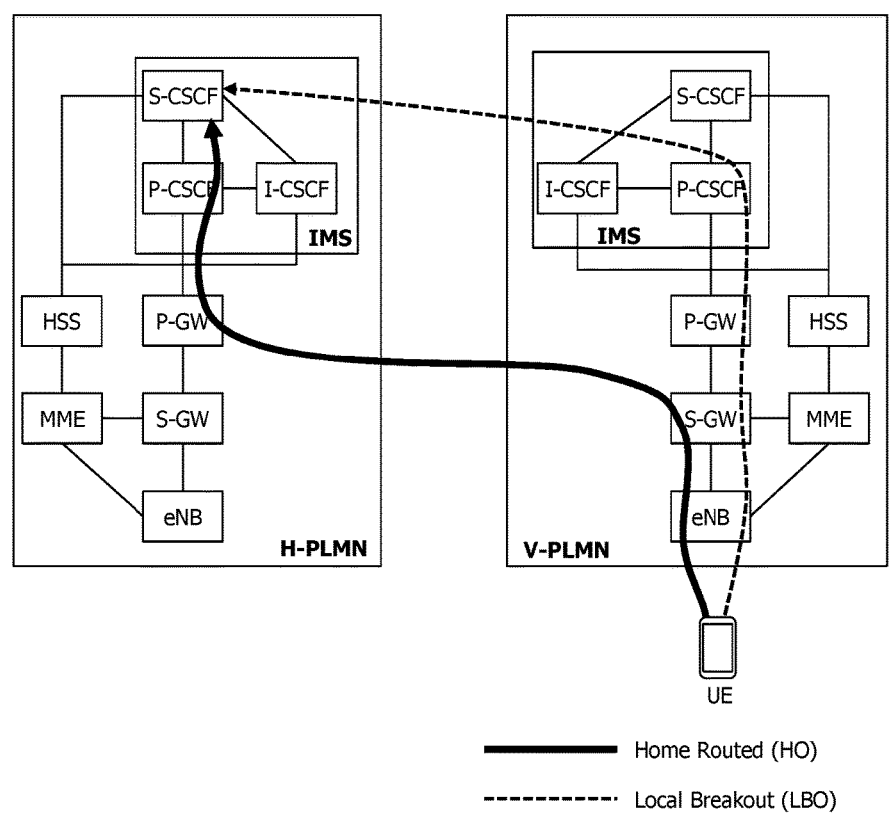
FIG. 6 illustrates a voice over LTE (VoLTE) roaming architecture.

FIG. 6 illustrates a voice over LTE (VoLTE) roaming architecture.

As illustrated in FIG. 6, the VoLTE roaming architecture includes a home routed (HR) architecture and a local breakout (LBO) architecture. According to the LBO architecture, an IMS signal transmitted from a UE is transmitted to an S-CSCF in a home public land mobile network (H-PLMN) via an S-GW/P-GW/P-CSCF in a visited PLMN (V-PLMN). In the HR architecture, the IMS signal is transmitted to the S-CSCF via the S-GW in the V-PLMN and a P-GW/P-CSCF in the H-PLMN.

Recently, an explosive increase in data aggravates congestion in 3GPP access of mobile carriers. To relieve such congestion, there is a move to offload UE data through a non-3GPP access WLAN. Hereinafter, an architecture for connecting a WLAN to an EPC is described.

Figure 7A:
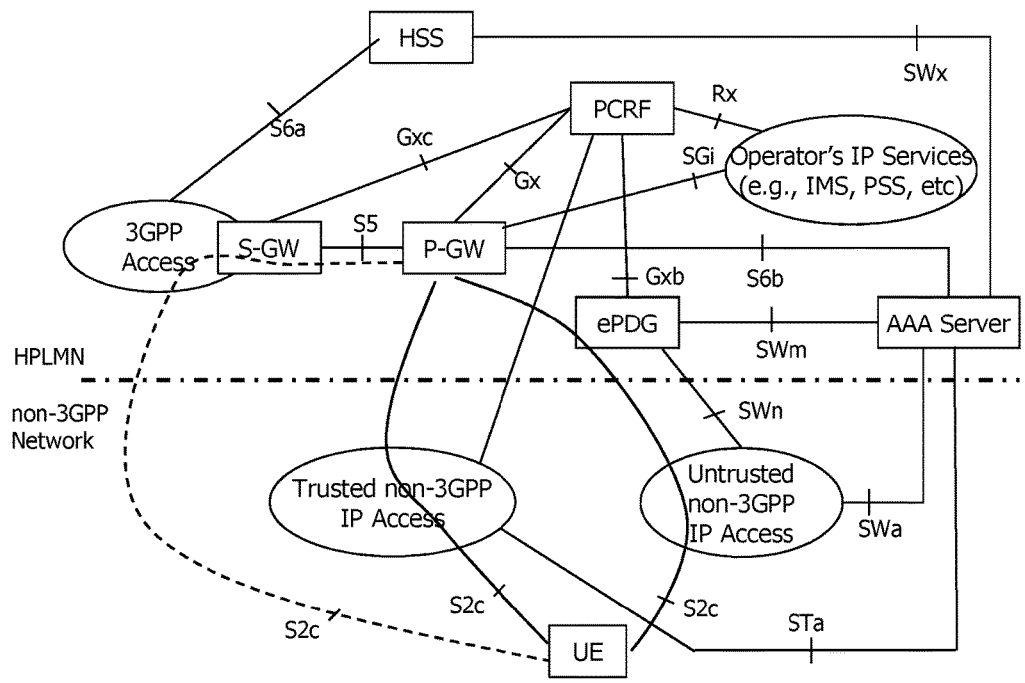
FIG. 7a and FIG. 7b illustrate an architecture in which a WLAN is connected to an EPC.
Figure 7B:
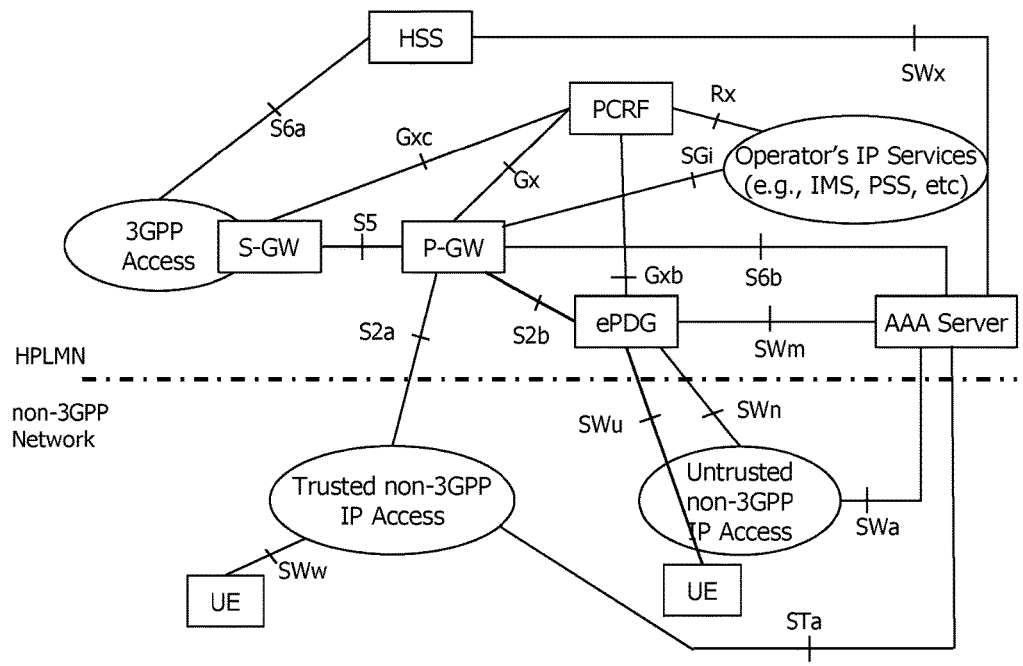

FIG. 7*a* and FIG. 7*b* illustrate an architecture in which a WLAN is connected to an EPC.

FIG. 7*a* illustrates an architecture in which a WLAN is connected to a P-GW through an S2c interface. FIG. 7*b* illustrates an architecture in which the WLAN is connected to the P-GW through an S2a interface. As illustrated in FIG. 7*b*, a WLAN access network (which becomes a trusted WLAN access network since the S2a interface is particularly an interface connecting a trusted non-3GPP access to the EPC) is connected to the P-GW through the S2a interface. The structure of a trusted WLAN (TWLAN) is described in TS 23.402.

FIG. 7*b* illustrates an architecture in which the WLAN is connected to the P-GW through an S2b interface. As illustrated in FIG. 7*b*, the WLAN access network (which becomes an untrusted WLAN access network since the S2b interface is particularly an interface connecting an untrusted non-3GPP access to the EPC) is connected through the S2b interface to the P-GW via an enhanced packet data gateway (ePDG) connected to the P-GW.

Hereinafter, the trusted WLAN and the untrusted WLAN are collectively referred to as a WLAN.

To offload traffic to a non-3GPP access, a mobile carrier provides a policy to a UE and the UE may offload data thereof to a WLAN according to the policy.

For the provision of the policy to the UE, a 3GPP-based access network discovery and selection function (ANDSF) has been improved to provide a WLAN-related policy.

Figure 8A:
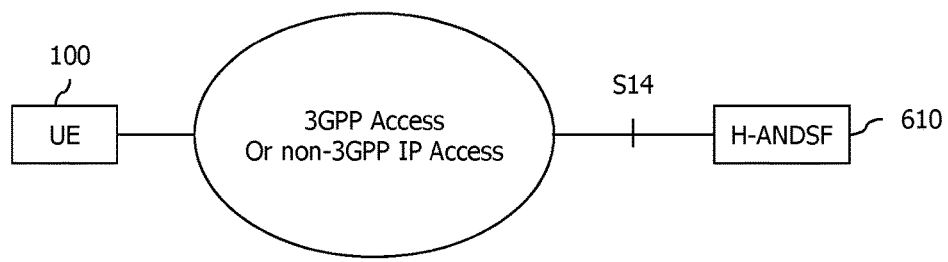
FIG. 8a and FIG. 8b illustrate a network control entity for access network selection.
Figure 8B:
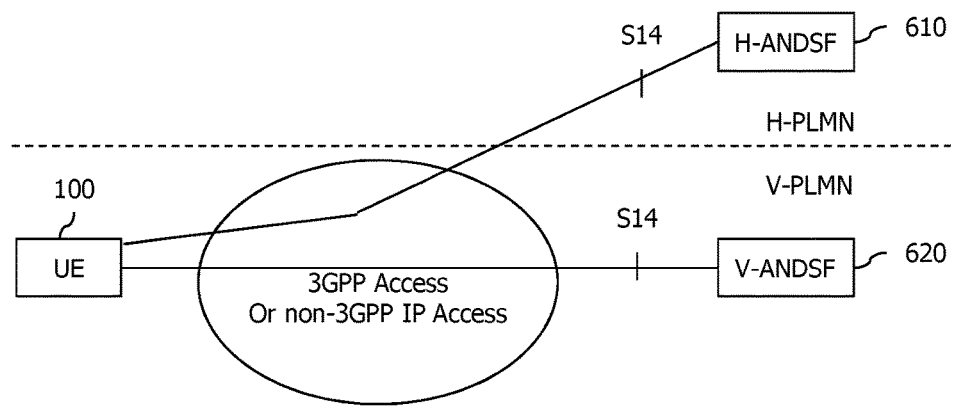

FIG. 8*a* and FIG. 8*b* illustrate a network control entity for access network selection.

As illustrated in FIG. 8*a*, the ANDSF may be present in a home public land mobile network (hereinafter, "H-PLMN") of a UE 10. Further, as illustrated in FIG. 8*b*, the ANDSF may also be present in a visited public land mobile network (hereinafter, "V-PLMN") of the UE 10. When present in the home network, the ANDSF may be referred to as an H-ANDSF 610; when present in the visited network, the ANDSF may be referred to as a V-ANDSF 620.

Hereinafter, the ANDSF generally refers to both the H-ANDSF 610 and the V-ANDSF 620.

The ANDSF may provide information on inter-system transfer policies, information for access network search, and information on inter-system routing, for example, routing rules.

Figure 9:
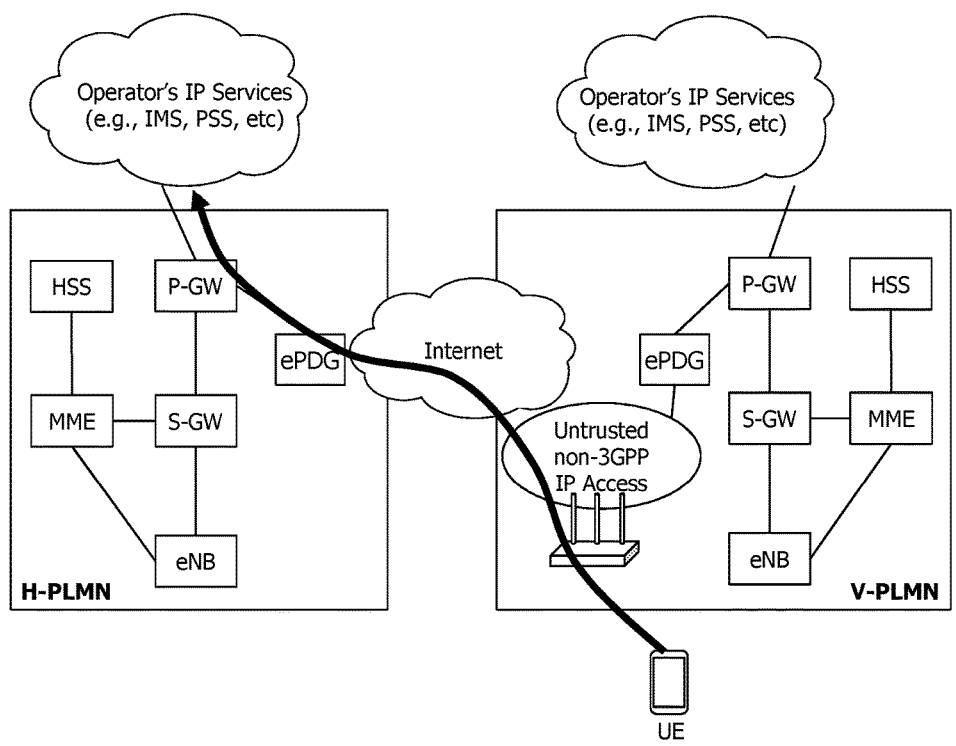
FIG. 9 illustrates that a UE roaming a visited network performs communications through an ePDN in a home network.

FIG. 9 illustrates that a UE roaming a visited network performs communications through an ePDN in a home network.

When a UE roaming a visited network (that is, V-PLNM) uses a WLAN (that is, Wi-Fi), the UE selects any one of an ePDG in a home network (that is, H-PLMN) and an ePDG in the visited network (that is, V-PLNM).

Here, when the identifier of the ePDG in the home network is set in the UE, the UE always selects the ePDG in the home network (that is, H-PLMN) although being located in the visited network (that is, V-PLMN). Further, when ePDG selection information is set in the UE and includes no matching information on the visited network (that is, V-PLMN) in which the UE is currently located, the UE also selects the ePDG in the home network (that is, H-PLMN).

Therefore, as illustrated in FIG. 9, the UE selects the ePDG in the home network (that is, H-PLMN). The UE performs communications via the ePDG in the home network (that is, H-PLMN) and a P-GW in the home network.

However, when the UE selects the ePDG in the home network (that is, H-PLMN), the UE forms an IPsec tunnel with the P-GW in the home network to transmit data, and thus it is impossible to monitor communications of the UE in the visited network.

DISCLOSURE OF THE PRESENT INVENTION

Therefore, the disclosure of the present specification is intended to present a solution to the foregoing problem. That is, the disclosure of the present specification suggests a method in which a UE roaming a visited network (that is, V-PLNM) is compelled to select an ePDG in a visited network (that is, V-PLMN), instead of an ePDG in a home network (that is, H-PLMN).

Figure 10:
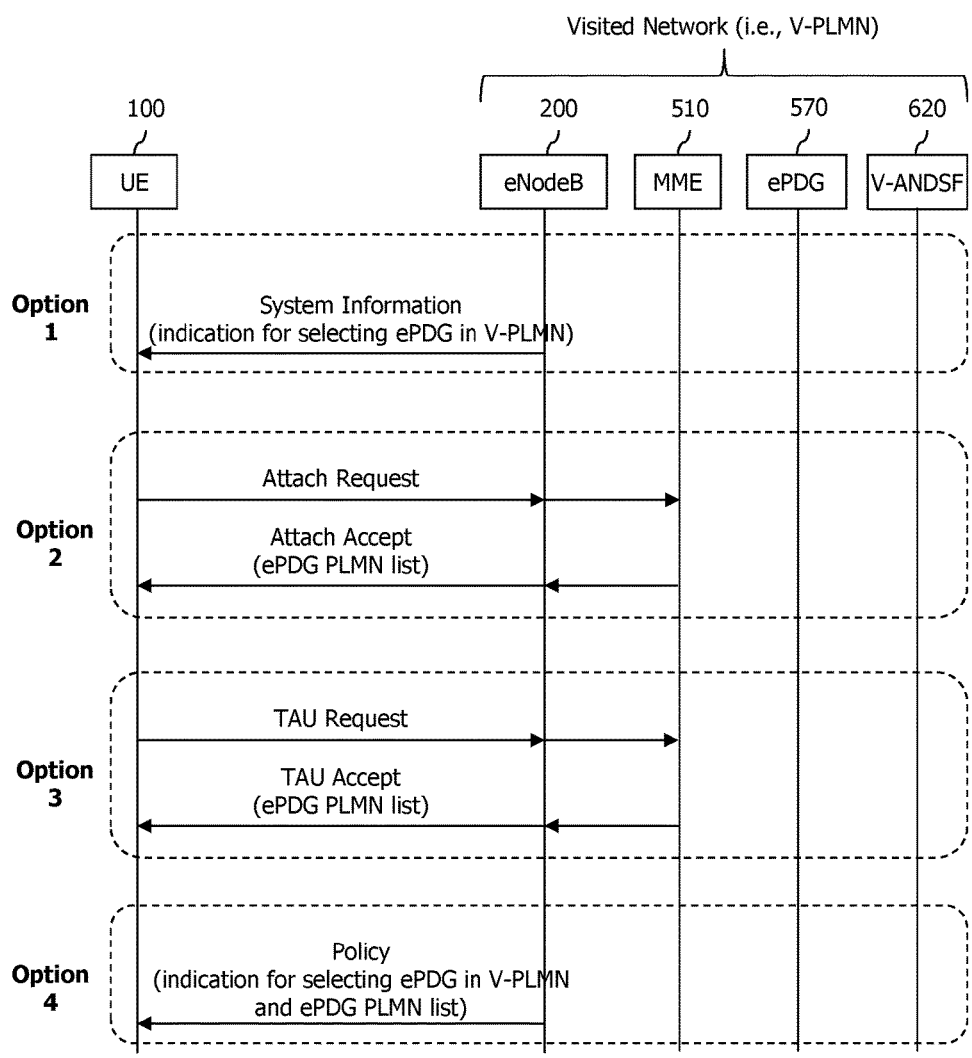
FIG. 10 illustrates a method according to the disclosure of the present specification.

FIG. 10 illustrates a method according to the disclosure of the present specification.

To compel a UE 10 roaming a visited network (that is, V-PLNM) to select an ePDG 570 in a visited network (that is, V-PLMN), instead of an ePDG in a home network (that is, H-PLMN), an eNode 200 in the visited network may broadcast system information, for example, a system information block (SIB), including an indication instructing a UE to always select an ePDG in a V-PLMN (for example, an indication for selecting an ePDG in a V-PLMN).

Further, as illustrated in option 2 or option 3, when the UE 100 transmits an attach request message or a tracking area update (TAU) request message in the visited network (that is, V-PLMN), an MME 510 in the visited network may transmit an attach accept or TAU accept message including information on an ePDG PLMN list necessary for ePDG selection. When the ePDG PLMN list is received, the UE 100 stores the ePDG PLMN list. Here, even though switching off, the UE 100 retains the ePDG PLMN list. The UE retains the ePDG PLMN list, without erasing the ePDG PLMN list, until a USIM is removed or the UE is attaches to another PLMN.

The ePDG PLMN list may include information on a currently serving PLMN, information on equivalent PLMNs to the serving PLMN, or information on PLMNs in the same country as the serving PLMN. The ePDG PLMN list may include priority information on of PLMNs or may have the PLMNs arranged according to priority.

Meanwhile, the attach accept or TAU accept message, like the SIB, may include an indication instructing a UE to always select an ePDG in a V-PLMN (for example, an indication for selecting an ePDG in a V-PLMN). The UE stores the indication included in the attach accept or TAU accept message along with the ePDG PLMN list.

Further, as illustrated in option 4, a V-ANDSF 620 in the visited network may include the indication (for example, an indication for selecting an ePDG in a V-PLMN) and the ePDG PLMN list in a policy to be transmitted to the UE 100. In this case, the UE 100 stores the indication received through the SIB separately from the indication and the ePDG PLMN list received through the attach accept/TAU accept message and the V-ANDSF 620. When the UE 100 receives information from all of the H-ANDSF/V-ANDSF, the UE 100 preferentially applies information received from the V-ANDSF. Further, when the UE 100 receives the indication and the ePDG PLMN list through the attach accept/TAU accept message or the policy of the V-ANDSF 620, the UE 100 applies the indication through the attach accept/TAU accept message or the policy of the V-ANDSF 620 in preference to the indication received through the SIB. Since the SIB is broadcast to all UEs in a cell of the eNodeB, when all UEs in the cell simultaneously select the ePDG in the visited network (V-PLMN), overload may occur. However, when the attach accept/TAU accept message or the policy of the V-ANDSF 620 are used, the indication and the ePDG PLMN list may be separately transmitted to the UEs, thus reducing overload.

Here, the indication obtained by the UE 100 through the attach accept/TAU accept message or the policy of the V-ANDSF 620 is valid only when the UE is successfully attached to the visited network. When the UE 100 is attached to the visited network in a limited service state, is detached from the visited network or is out of the coverage of the visited network, the UE 100 needs to follow the indication broadcast through the SIB.

When the UE 100 selects an ePDG in the visited network (that is, V-PLMN) based on the received indication, the UE 100 creates a fully qualified domain name (FQDN) based on the ePDG PLMN list and performs an ePDG selection process through the FQDN.

Meanwhile, an operation may vary depending on whether the UE 100 is located inside or outside the coverage of a 3GPP BS, which is described in detail hereinafter.

1) When UE is in Coverage of 3GPP BS

When the UE 100 is located in the coverage of the 3GPP BS, the UE 100 may receive the indication (that is, an indication for selecting an ePDG in a V-PLMN) from a network. Thus, the UE 100 recognizes that the UE 100 needs to select the ePDG in the V-PLMN when connecting to an EPC through a WLAN (Wi-Fi).

1-1) Served by PLMN

When the UE 100 is already attached to the PLMN to be served, the UE 100 receives the ePDG PLMN list through the attach accept/TAU accept message, and thus the UE 100 recognizes which ePDG of a PLMN the UE 100 needs to select. The UE 100 first creates an FQDN using serving PLMN information to select an ePDG designated by the currently serving PLMN before selecting an ePDG based on information in the ePDG PLMN list, discovers the IP address of the ePDG by querying the FQDN to a DNS server, and attempts to access the ePDG. When access to the ePDG fails, the UE 100 needs to reattempt access based on information on another PLMN in the ePDG PLMN list.

When PLMNs in the ePDG PLMN list are prioritized, the UE 100 attempts ePDG selection from a PLMN with a higher priority. Alternatively, the UE 100 performs an ePDG selection process (for example, first attempts to select an ePDG of an equivalent PLMN to the serving PLMN or first attempts to select an ePDG of a PLMN if the PLMN is received through WLAN ANQP information) based on information that the UE 100 has.

1-2) Not Served by any PLMN

When the UE 100 is not attached to a specific PLMN but receives the indication through an SIB broadcast from a neighboring BS, the UE 100 needs to select an ePDG of a V-PLMN.

When the UE 100 has previously been attached to the specific PLMN and thus has an ePDG PLMN list and the ePDG PLMN list includes a PLMN to which the neighboring BS belongs, the UE 100 selects the ePDG as in 1-1). When the UE 100 does not have the ePDG PLMN list or the ePDG PLMN list does not include the PLMN to which the neighboring BS belongs, the UE 100 creates an FQDN based on the information on the PLMN to which the BS belongs to select an ePDG.

2) When UE is Out of Coverage of 3GPP BS

When the UE 100 can recognize a country based on current location information on the UE 100 (for example, information acquired through a GPS, recently updated cell information, a WLAN SSID, a WLAN IP address, and a WLAN ANQP) and when the UE 100 has previously been attached to a PLMN of the country and thus stores an ePDG PLMN list and the indication, the UE 100 selects the PLMN belonging to the country where the UE 100 is located from the ePDG PLMN list and selects an ePDG.

3) When UE Fails to Select ePDG

When the UE 100 receives the indication, the UE may perform an ePDG selection process according to the descriptions made in 1) and 2-1). When the UE 100 receives the indication but does not receive the ePDG PLMN list, the UE 100 does not select an ePDG and performs EPC access using a different method or different RAT (for example, TWAN and 3GPP). When the UE 100 is allowed to access an EPC only through an ePDG, the UE should not allow a service through an ePDG.

Figure 11:
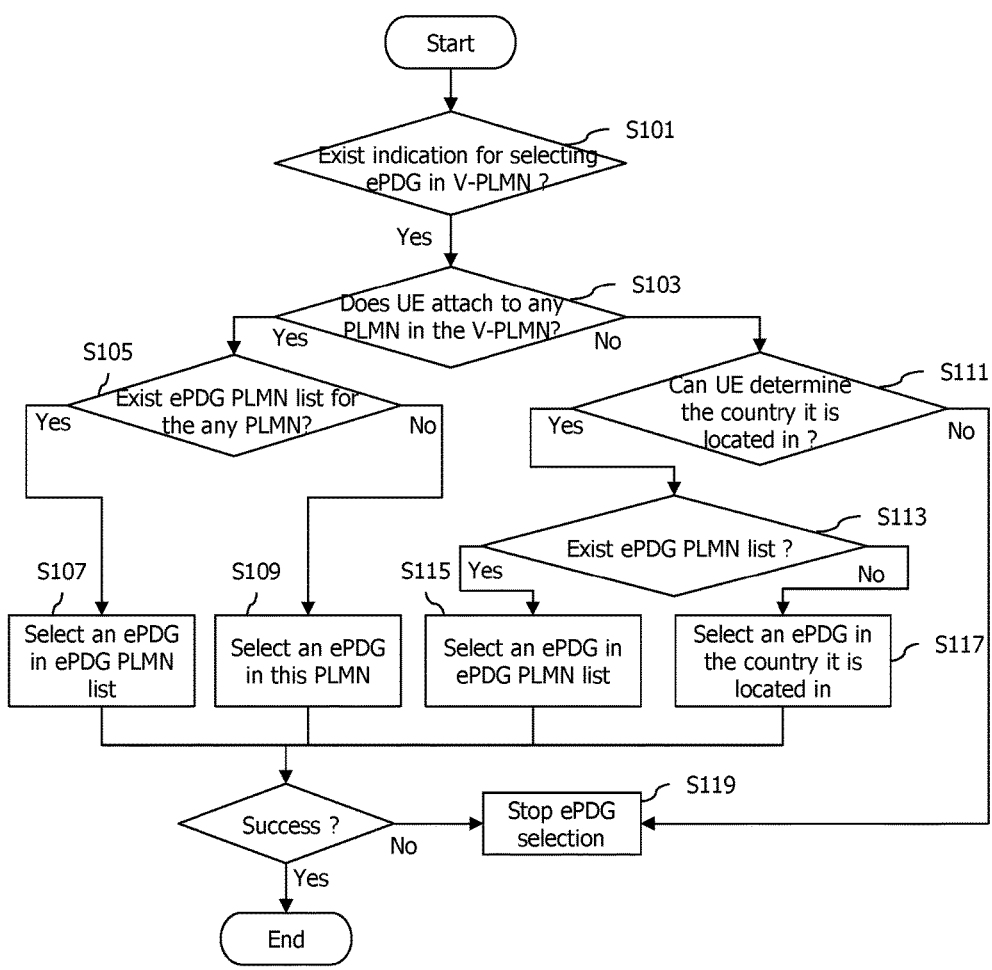
FIG. 11 is a flowchart illustrating an ePDG selection procedure according to the disclosure of the present specification.

FIG. 11 is a flowchart illustrating an ePDG selection procedure according to the disclosure of the present specification.

Referring to FIG. 11, a UE 100 determines whether the UE 100 receives and stores the foregoing indication (that is, an indication for selecting an ePDG in a V-PLMN) through an SIB from a BS, an attach accept/TAU accept message, or a policy from an ANDSF (S101).

When the indication is stored, the UE 100 determines whether the UE 100 is attached to any PLMN in the V-PLMN (S103).

When the UE is attached to any PLMN in the V-PLM, the UE 100 determines whether the UE 100 stores an ePDG PLMN list (S105). When the UE 100 has the ePDG PLMN list, the UE 100 selects an ePDG in the ePDG PLMN list (S107). When the UE does not have the ePDG PLMN list, the UE 100 selects an ePDG in the PLMN to which the UE 100 is currently attached (S109).

When the UE 100 is not attached to any PLMN in the V-PLMN, the UE 100 determines a country in which the UE 100 is currently located (S111). When the UE 100 can know the country, the UE 100 determines whether the UE 100 has an ePDG PLMN list previously received from the country (S113). When the UE 100 has the ePDG PLMN list, the UE 100 selects an ePDG from the ePDG PLMN list (S115).

However, when the UE 100 does not have the ePDG PLMN list, the UE 100 selects an ePDG belonging to the country in which the UE 100 is currently located (S117). Here, the UE 100 may use a well-known FQDN (for example, ePDG.LI.mncXXX.mccXXX.3gppnetwork.org, ePDG.LI.3gppnetwork.us) to select the ePDG belonging to the country in which the UE 100 is currently located.

The UE 100 stops selecting an ePDG when the UE 100 does not know the current location of the UE 100 (S119).

The foregoing descriptions may be implemented in hardware, which is described with reference to FIG. 12.

Figure 12:
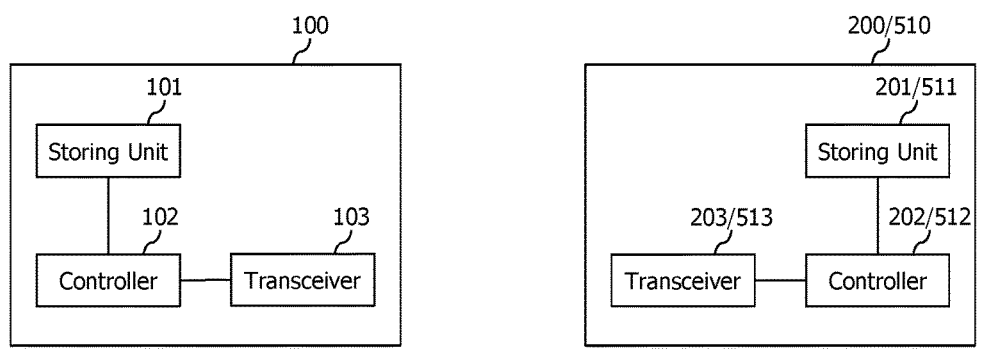
FIG. 12 is a block diagram illustrating a configuration of a UE 100 and a network node according to an embodiment of the present invention.

FIG. 12 is a block diagram illustrating a configuration of a UE 100 and a network node according to an embodiment of the present invention.

As illustrated in FIG. 12, the UE 100 includes a storing unit 101, a controller 102, and a transceiver 103. The network node may be a BS 200 or an MME 510. The network node includes a storing unit 201/511, a controller 202/512, and a transceiver 203/513.

The storing units store the foregoing methods.

The controllers control the storing units and the transceivers. Specifically, the controllers perform the methods stored in the storing units. The controllers transmit the foregoing signals through the transceivers.

Although exemplary embodiments of the present invention have been illustrated above, the scope of the present invention is not limited by these specific embodiments. Therefore, the present invention may be changed, modified, or adapted variously without departing from the idea of the present invention and the appended claims.

What is claimed is:

1. A method for selecting an enhanced packet data gateway (ePDG), the method performed by a user equipment (UE) and comprising:
   determining, by the UE which has roamed from a home public land mobile network (H-PLMN) to a visited public land mobile network (V-PLMN), whether there exists an indication for selecting the ePDG in the V-PLMN;
   determining, by the UE, whether the UE has attached to a PLMN in the V-PLMN, when it is determined that there is an indication for selecting the ePDG;
   determining, by the UE, whether there exists the ePDG PLMN list for the PLMN in the V-PLMN, when it is determined that the UE has attached to the PLMN in the V-PLMN;
   selecting, by the UE, at least one ePDG in the ePDG PLMN list, when it is determined that the ePDG PLMN list for PLMN exists;
   determining a country in which the UE is located, when it is determined that the UE has not attached to any PLMN in the V-PLMN;
   determining whether the ePDG PLMN list for the determined country exists; and
   selecting at least one ePDG in the ePDG PLMN list for the determined country, when it is determined that the ePDG PLMN list for the determined country exists.

2. The method of claim 1, further comprising:
   receiving the indication for selecting the ePDG in the V-PLMN,
   wherein the indication is received by using at least one of a system information block (SIB), an Attach Accept message, a tracking area update (TAU) accept message and a policy of access network discovery and selection Function (ANDSF).

3. The method of claim 1, further comprising:
receiving any of the ePDG PLMN list by using at least one of a system information block (SIB), an Attach Accept message, a tracking area update (TAU) accept message and a policy of access network discovery and selection Function (ANDSF).

4. The method of claim 1, further comprising:
selecting any ePDG in the determined country when it is determined that the ePDG PLMN list for the determined country does not exist.

5. The method of claim 1, further comprising:
selecting any ePDG for the PLMN, when it is determined that an ePDG PLMN list for the PLMN does not exist.

6. A user equipment (UE) for selecting an enhanced packet data gateway (ePDG), the UE comprising:
a transceiver; and
a processor that:
determines, in a roamed state from a home public land mobile network (H-PLMN) to a visited public land mobile network (V-PLMN), whether there exists an indication for selecting the ePDG in the V-PLMN;
determines whether the UE has attached to a PLMN in the V-PLMN, when it is determined that there is an indication for selecting the ePDG;
determining whether there exists an ePDG PLMN list for the PLMN in the V-PLMN, when it is determined that the UE has attached to the PLMN;
selecting at least one ePDG in the ePDG PLMN list, when it is determined that the ePDG PLMN list for the PLMN exists;
determining a country in which the UE is located, when it is determined that the UE has not attached to any PLMN in the V-PLMN;
determining whether the ePDG PLMN list for the determined country exists; and
selecting at least one ePDG in the ePDG PLMN list for the determined country, when it is determined that the ePDG PLMN list for the determined country exists.

7. The UE of claim 6, wherein the processor controls the transceiver to receive the indication for selecting the ePDG in the V-PLMN, wherein the indication is received by using at least one of a system information block (SIB), an Attach Accept message, a tracking area update (TAU) accept message and a policy of access network discovery and selection Function (ANDSF).

8. The UE of claim 6, wherein the processor controls the transceiver to receive any of the ePDG PLMN list by using at least one of a system information block (SIB), an Attach Accept message, a tracking area update (TAU) accept message and a policy of access network discovery and selection Function (ANDSF).

9. The UE of claim 6, wherein the processor further:
selects any ePDG in the determined country when it is determined that the ePDG PLMN list for the determined country does not exist.

10. The UE of claim 6, wherein the processor further selects any ePDG for the PLMN, when it is determined an ePDG PLMN list for the PLMN does not exist.

\* \* \* \* \*